United States Patent
Jeong et al.

(10) Patent No.: US 10,304,211 B2
(45) Date of Patent: May 28, 2019

(54) METHOD AND APPARATUS FOR PROCESSING IMAGE

(71) Applicant: SAMSUNG ELECTRONICS CO., LTD., Suwon-si (KR)

(72) Inventors: Young Ju Jeong, Yongin-si (KR); Dong Kyung Nam, Yongin-si (KR); Yang Ho Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 229 days.

(21) Appl. No.: 15/487,687

(22) Filed: Apr. 14, 2017

(65) Prior Publication Data

US 2018/0144504 A1 May 24, 2018

(30) Foreign Application Priority Data

Nov. 22, 2016 (KR) .................. 10-2016-0155951

(51) Int. Cl.
| | |
|---|---|
| *G06K 9/00* | (2006.01) |
| *G06T 7/90* | (2017.01) |
| *G06T 7/73* | (2017.01) |
| *G06T 7/00* | (2017.01) |
| *G06T 11/00* | (2006.01) |
| *G06T 11/20* | (2006.01) |

(52) U.S. Cl.
CPC .............. *G06T 7/90* (2017.01); *G06T 7/74* (2017.01); *G06T 7/97* (2017.01); *G06T 11/001* (2013.01); *G06T 11/203* (2013.01); *G06T 2200/12* (2013.01); *G06T 2207/10024* (2013.01)

(58) Field of Classification Search
CPC ....... G06T 7/90; G06T 11/203; G06T 11/001; G06T 7/74; G06T 7/97; G06T 2200/12; G06T 2207/10024
See application file for complete search history.

(56) References Cited

U.S. PATENT DOCUMENTS

| | | | |
|---|---|---|---|
| 5,651,104 A * | 7/1997 | Cosman | G06T 15/04 345/428 |
| 6,445,807 B1 * | 9/2002 | Katayama | G06T 15/10 345/427 |
| 6,897,879 B2 | 5/2005 | Lyapunov et al. | |

(Continued)

FOREIGN PATENT DOCUMENTS

| | | |
|---|---|---|
| KR | 10-0468851 B1 | 1/2005 |
| KR | 10-0504421 B1 | 7/2005 |

(Continued)

*Primary Examiner* — Samir A Ahmed
(74) *Attorney, Agent, or Firm* — Sughrue Mion, PLLC

(57) ABSTRACT

A method of processing an image includes obtaining a position of a viewpoint corresponding to the image, selecting, based on the position, two reference rays closest to a ray included in the image from among a plurality of reference rays included in reference images photographed in advance from different reference viewpoints; determining whether a difference between color values of the selected reference rays is less than or equal to a threshold; and determining a color value of the ray based on the color values of the selected reference rays in response to the difference between the color values of the selected reference rays being determined to be less than or equal to the threshold.

18 Claims, 12 Drawing Sheets

(56) References Cited

U.S. PATENT DOCUMENTS

| | | | |
|---|---|---|---|
| 2007/0296721 A1* | 12/2007 | Chang | G06T 15/10 345/427 |
| 2012/0169722 A1* | 7/2012 | Hwang | H04N 13/111 345/419 |
| 2013/0315473 A1* | 11/2013 | Takahashi | G06T 15/205 382/154 |
| 2013/0336589 A1* | 12/2013 | Takahashi | G06T 9/00 382/215 |
| 2014/0267243 A1* | 9/2014 | Venkataraman | G06T 7/557 345/419 |
| 2015/0077526 A1* | 3/2015 | Kim | H04N 13/376 348/51 |
| 2015/0125093 A1* | 5/2015 | Jeong | G06T 5/005 382/284 |
| 2017/0180700 A1 | 6/2017 | Cho et al. | |

FOREIGN PATENT DOCUMENTS

| | | |
|---|---|---|
| KR | 10-0897724 B1 | 5/2009 |
| KR | 10-0923053 B1 | 10/2009 |
| KR | 10-1060322 B1 | 8/2011 |
| KR | 10-1112142 B1 | 3/2012 |
| KR | 10-20120082336 A | 7/2012 |
| KR | 10-1498535 B1 | 3/2015 |
| KR | 10-1574422 B1 | 12/2015 |
| KR | 10-1602472 B1 | 3/2016 |

* cited by examiner

METHOD AND APPARATUS FOR PROCESSING IMAGE

CROSS-REFERENCE TO RELATED APPLICATION

This application claims priority from Korean Patent Application No. 10-2016-0155951, filed on Nov. 22, 2016 in the Korean Intellectual Property Office, the disclosure of which is incorporated herein by reference in its entirety.

BACKGROUND

1. Field

Methods and apparatuses consistent with exemplary embodiments disclosed herein relate to a method and apparatus for processing an image.

2. Description of the Related Art

A multi-view image processing scheme may divide a viewing area to spatially map images photographed by a plurality of cameras such that viewers may view an image having respective viewpoints based on a viewing position. The multi-view image processing scheme may increase viewpoint freedom for viewers.

To display the multi-view image more naturally, a viewing area should be finely divided and it may be necessary or desirable to provide a large number of viewing images which are viewable in the divided viewing areas.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a method of processing an image, the method including: obtaining a position of a viewpoint corresponding to the image; selecting, based on the position, two reference rays closest to a ray included in the image from among a plurality of reference rays included in reference images photographed in advance from different reference viewpoints; determining whether a difference between color values of the selected reference rays is less than or equal to a threshold; and determining a color value of the ray based on the color values of the selected reference rays in response to the difference between the color values of the selected reference rays being determined to be less than or equal to the threshold.

The selecting of the reference rays may include determining two reference viewpoints closest to the ray among the different reference viewpoints based on the position and selecting the two reference rays closest to the ray from among reference rays corresponding to the determined reference viewpoints.

The selecting of the reference rays may further include selecting two reference rays each corresponding to a pixel that outputs the ray from among the reference rays corresponding to the determined reference viewpoints.

The determining of the two reference viewpoints may include determining the two reference viewpoints closest to the ray based on a distance from each of the different reference viewpoints to the ray.

The method may further include: reselecting reference rays corresponding to neighboring pixels that are symmetrical about a pixel that outputs the ray in response to the difference between the color values of the selected reference rays being determined to exceed the threshold; and determining whether a difference between color values of the reselected reference rays is less than or equal to the threshold.

The reselecting of the reference rays may include selecting neighboring pixels in which an edge exists from among the neighboring pixels that are symmetrical about the pixel and reselecting reference rays output from the selected neighboring pixels.

The reselecting of the reference rays may include determining the neighboring pixels that are symmetrical about the pixel in an order of proximity to the pixel and reselecting reference rays output from the determined neighboring pixels.

The reselected reference rays may correspond to two reference viewpoints determined to be closest to the ray.

The determining of the color value of the ray may include interpolating the color value of the ray based on the color values of the selected reference rays.

The method may further include outputting the ray from a pixel of a display that displays the image such that the ray is propagated to the viewpoint.

According to an aspect of another exemplary embodiment, there is provided a non-transitory computer-readable storage medium storing a program which, when executed, causes a computer to implement the method according to an aspect of an exemplary embodiment.

According to an aspect of another exemplary embodiment, there is provided an image processing apparatus including: a processor; and a memory including at least one instruction to be executed by the processor, wherein, in response to the at least one instruction being executed by the processor, the processor is configured to obtain a position of a viewpoint corresponding to an image, select, based on the position, two reference rays closest to a ray included in the image from among a plurality of reference images photographed in advance from different reference viewpoints, determine whether a difference between color values of the selected reference rays is less than or equal to a threshold, and determine a color value of the ray based on the color values of the selected reference rays in response to the difference between the color values of the selected reference rays being determined to be less than or equal to the threshold.

The processor may be further configured to determine two reference viewpoints closest to the ray among the different reference viewpoints based on the position and select the two reference rays closest to the ray from among reference rays corresponding to the determined reference viewpoints.

The processor may be further configured to select two reference rays each corresponding to a pixel that outputs the ray from among the reference rays corresponding to the determined reference viewpoints.

The processor may be further configured to reselect reference rays corresponding to neighboring pixels that are symmetrical about a pixel that outputs the ray in response to the difference between the color values of the selected reference rays being determined to exceed the threshold and determine whether a difference between color values of the reselected reference rays is less than or equal to the threshold.

The processor may be further configured to determine the neighboring pixels that are symmetrical about the pixel in an order of proximity to the pixel and reselect reference rays output from the determined neighboring pixels.

The reselected reference rays may correspond to two reference viewpoints determined to be closest to the ray.

The processor may be further configured to interpolate the color value of the ray based on the color values of the selected reference rays.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
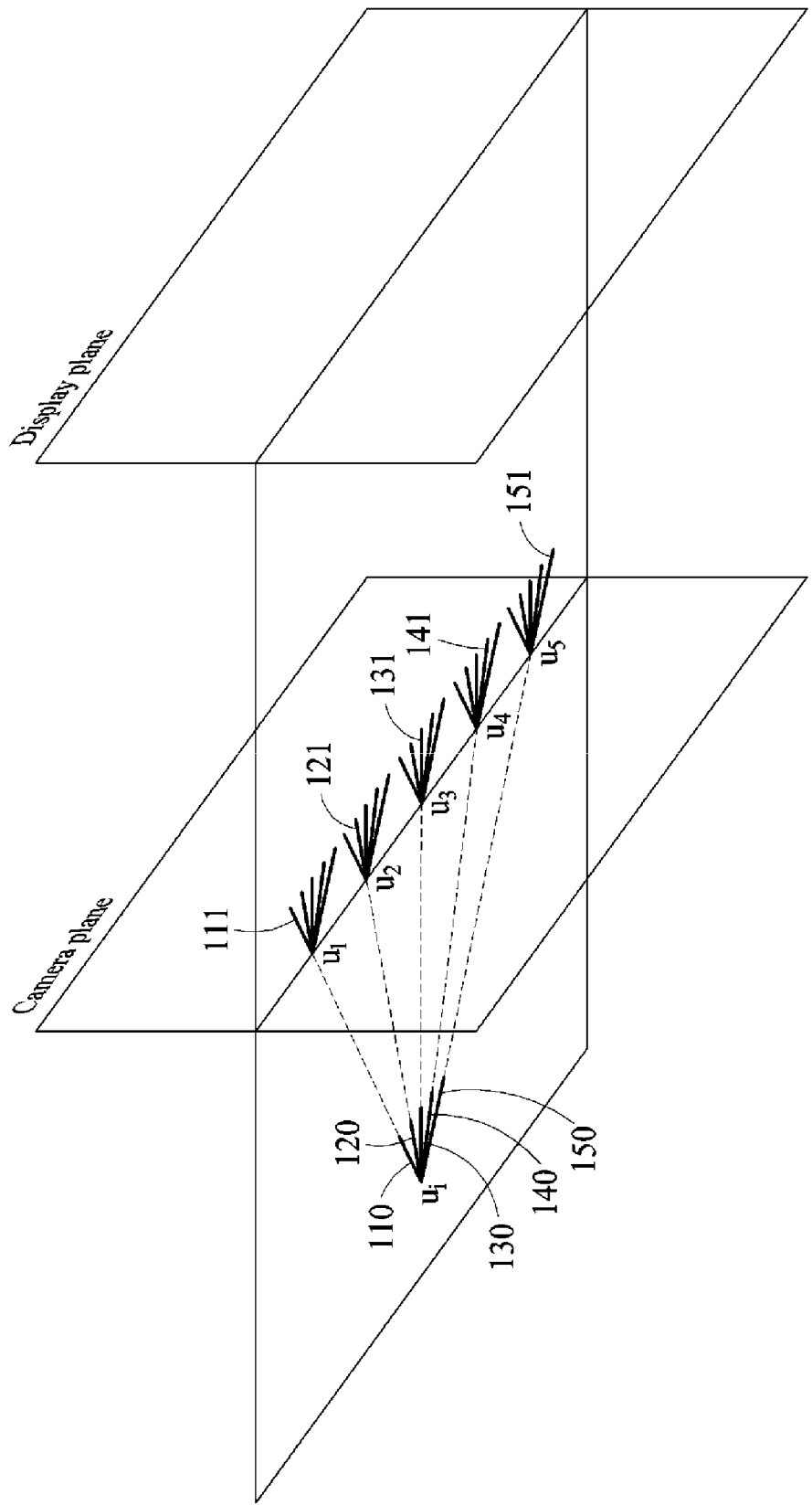
FIGS. 1 and 2 each illustrate a process of determining a ray corresponding to a new viewpoint according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

The terminology used herein is for the purpose of describing the exemplary embodiments only and is not intended to be limiting of the disclosure. As used herein, the singular forms "a," "an," and "the" are intended to include the plural forms as well, unless the context clearly indicates otherwise. It will be further understood that the terms "include/comprise" and/or "have," when used in this disclosure, specify the presence of stated features, integers, steps, operations, elements, components, or combinations thereof, but do not preclude the presence or addition of one or more other features, integers, steps, operations, elements, components, and/or groups thereof. In addition, the terms such as "unit," "-er (-or)," and "module" described in the specification may refer to an element for performing at least one function or operation, and may be implemented in hardware, software, or the combination of hardware and software.

Terms such as first, second, A, B, (a), (b), and the like may be used herein to describe components. Each of these terminologies is not used to define an essence, order or sequence of a corresponding component but rather is used to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Exemplary embodiments to be described hereinafter may be used to process an image. Hereinafter, an operation of processing an image may include an operation of generating an image of a new viewpoint from a multi-view image which is photographed in advance. The exemplary embodiments may be embodied in various forms of products, for example, a smartphone, a wearable device, a tablet computer, a television (TV), a personal computer (PC), a laptop computer, and a smart home appliance. For example, the exemplary embodiments may be applicable to a display apparatus for processing an image. In addition, the exemplary embodiments may be applicable to, for example, a virtual reality (VR) device and an augmented reality (AR) device, for generating and displaying an image based on a position of a device. Hereinafter, exemplary embodiments are described in detail with reference to the accompanying drawings. Like reference numerals in the drawings denote like elements, and a known function or configuration will be omitted herein.

Figure 2:
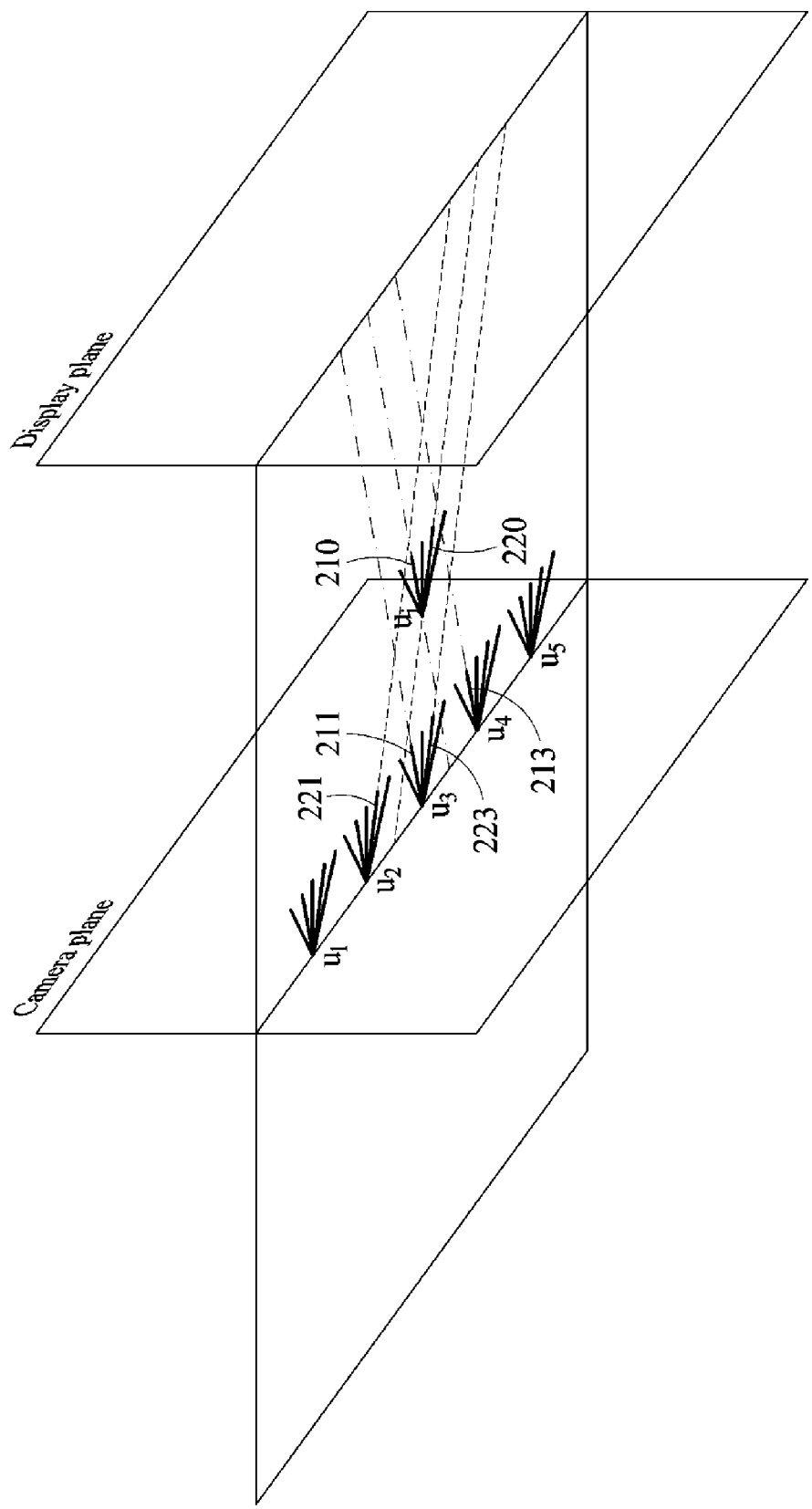

FIGS. 1 and 2 each illustrate a process of determining a ray corresponding to a new viewpoint according to an exemplary embodiment.

FIG. 1 illustrates an example of a method by which an image processing apparatus determines the ray corresponding to the new viewpoint.

The image processing apparatus is an apparatus for processing an image and includes, for example, an apparatus for generating an image of a new viewpoint from a multi-view image. For example, the image processing apparatus generates an image of a new viewpoint based on a free view rendering (FVR) scheme.

The multi-view image may include reference images photographed in advance from different reference viewpoints. Referring to FIG. 1, the multi-view image includes reference images photographed from a first reference viewpoint $u_1$ through a fifth reference viewpoint $u_5$, respectively. Because reference images are photographed through cameras located at reference viewpoints, the reference viewpoints may be located on a camera plane.

A reference image is an image corresponding to a respective reference viewpoint and may include a plurality of rays. A ray is output from a pixel of a display and propagated to the corresponding reference viewpoint, and may uniquely correspond to the pixel of the display. A color value of the ray may correspond to a color value of a color displayed in a corresponding pixel. The pixels included in the display may be located on a display plane. Thus, rays corresponding to a reference viewpoint may be output from a plurality of pixels of the display and clustered at the corresponding reference viewpoint.

It is assumed that the image processing apparatus generates an image corresponding to a new viewpoint $u_i$. The image corresponding to the new viewpoint $u_i$ may be generated by determining color values of rays corresponding to the new viewpoint $u_i$.

For example, a first ray 110 through a fifth ray 150 each corresponding to the new viewpoint $u_i$ are generated based on rays included in the photographed reference images. The first ray 110 is determined to be a ray 111 of the first reference viewpoint $u_1$, the second ray 120 is determined to be a ray 121 of the second reference viewpoint $u_2$, the third ray 130 is determined to be a ray 131 of the third reference viewpoint $u_3$, the fourth ray 140 is determined to be a ray 141 of the fourth reference viewpoint $u_4$, and the fifth ray 150 is determined to be a ray 151 of the fifth reference viewpoint $u_5$. That is, rays included in the image of the new viewpoint $u_i$ may be generated based on a combination of rays included in reference images. However, there may be a case in which the rays corresponding to the new viewpoint $u_i$ may not be generated based on the combination of the rays included in the reference images. Detailed description about the case will be provided with reference to FIG. 2.

FIG. 2 illustrates another example of the method by which the image processing apparatus determines the ray corresponding to the new viewpoint $u_i$.

In an example, a number of reference images included in a multi-view image may be insufficient, such that a ray included in the image of the new viewpoint $u_i$ may be absent from the reference images. In this example, a plurality of reference rays included in a reference image may be used to determine a single ray included in the image of the new viewpoint $u_i$.

For example, a first ray 210 of the new viewpoint $u_i$ is determined based on two reference rays, for example, a reference ray 211 of the third reference viewpoint $u_3$ and a reference ray 213 of the fourth reference viewpoint $u_4$, close to the first ray 210. The first ray 210 may be determined through an interpolation based on the reference ray 211 of the third reference viewpoint $u_3$ and the reference ray 213 of the fourth reference viewpoint $u_4$.

In addition, a second ray 220 of the new viewpoint $u_i$ may be determined based on two reference rays, for example, a reference ray 221 of the second reference viewpoint $u_2$ and a reference ray 223 of the third reference viewpoint $u_3$, close to the second ray 220. The second ray 220 may be determined through the interpolation based on the reference ray 221 of the second reference viewpoint $u_2$ and the reference ray 223 of the third reference viewpoint $u_3$.

As described above, a ray of the new viewpoint $u_i$ may be determined based on a reference ray of reference viewpoints close to the ray. In addition, a reference viewpoint close to the ray of the new viewpoint $u_i$ may be determined based on a ray to be determined. A detailed description of a process of determining the ray of the new viewpoint $u_i$ is provided below.

Figure 3:
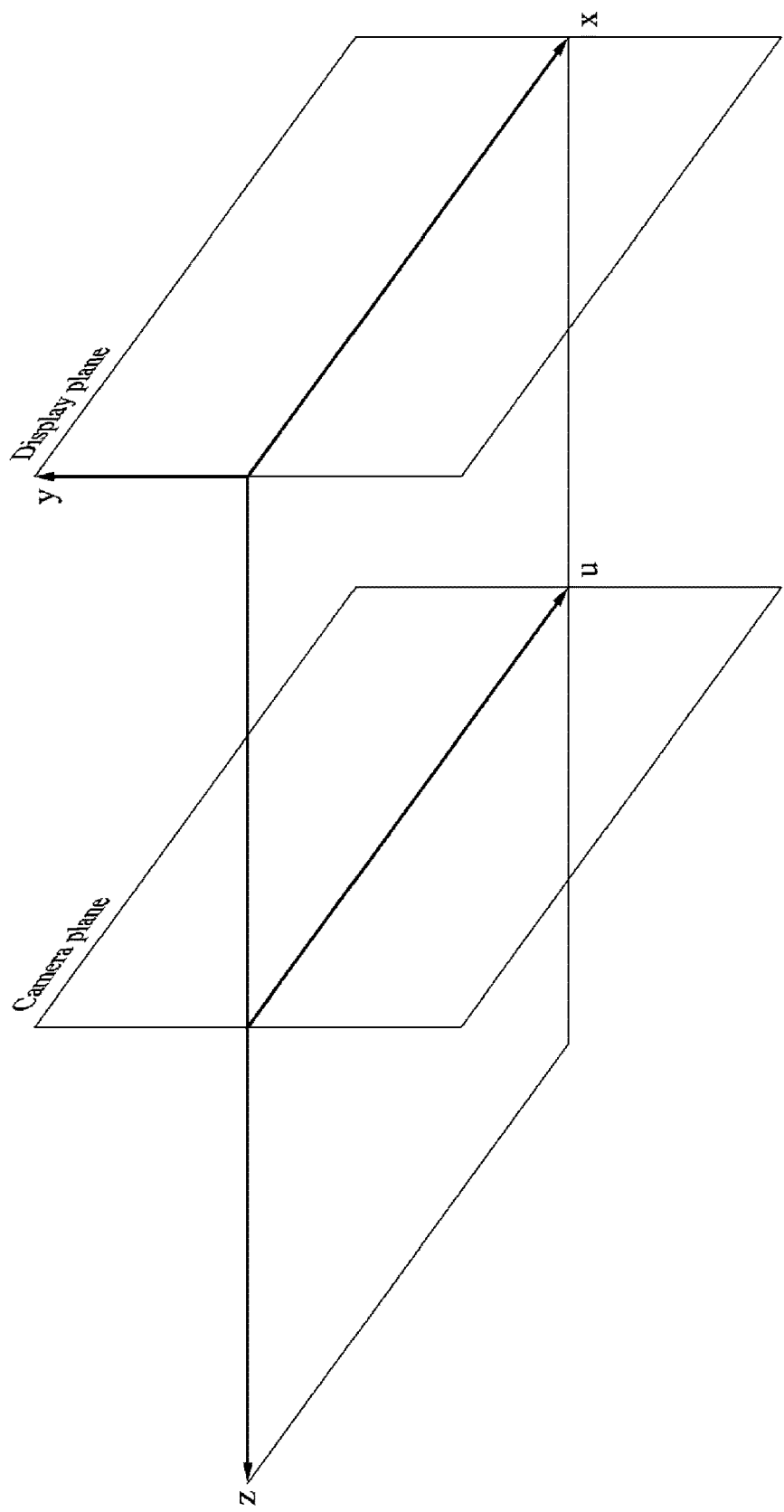
FIG. 3 illustrates an axis for converting a light field space according to an exemplary embodiment.

FIG. 3 illustrates an axis for converting a light field space according to an exemplary embodiment.

FIG. 3 illustrates an x-axis, a y-axis, a u-axis, and a z-axis for converting the light field space.

A display plane refers to a plane on which a display is located, and an image may be displayed on the display. The display plane may have an x-axis and a y-axis. For ease of description, an operation of the image processing apparatus is described based on the x-axis. However, such description does not indicate that the operation of the image processing apparatus is limited to the way of operation described below, and such description is also applicable when the operation of the image processing apparatus is based on the y-axis.

A camera plane refers to a plane on which a camera that photographs a multi-view image is located, and reference viewpoints may be located on the camera plane. A u-axis of the camera plane corresponds to the x-axis of the display plane, and a coordinate value of a reference viewpoint may be defined based on the u-axis of the camera plane.

The z-axis indicates a distance from the display plane, and the z-axis may be set based on the display plane. In another example, a direction of the z-axis is set to be opposite to a direction of the z-axis of FIG. 3. However, for ease of description, the operation of the image processing apparatus is described based on the direction of the z-axis of FIG. 3.

Figure 4:
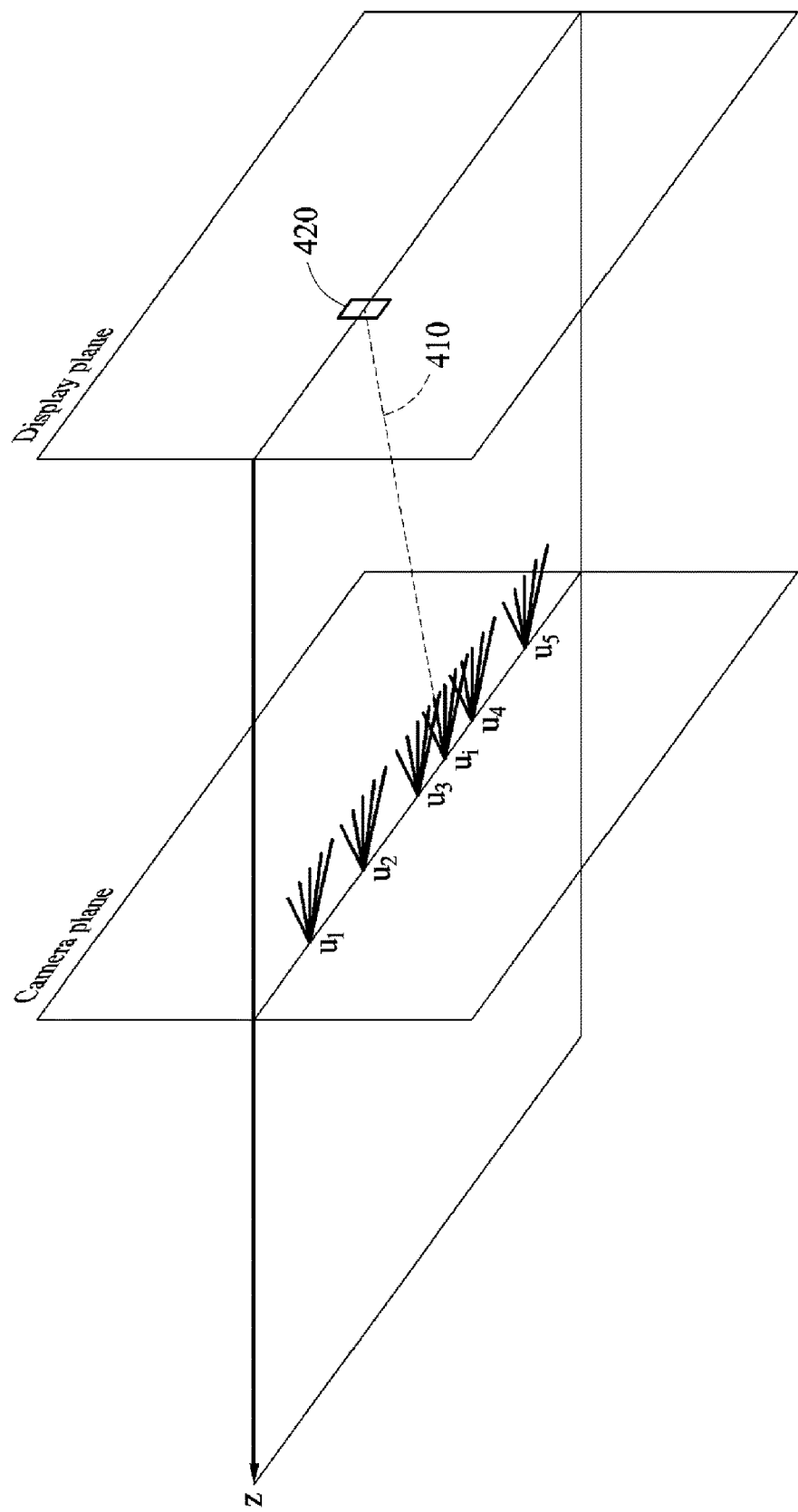
FIGS. 4 and 5 each illustrate a process of determining two reference viewpoints closest to a ray according to an exemplary embodiment.
Figure 5:
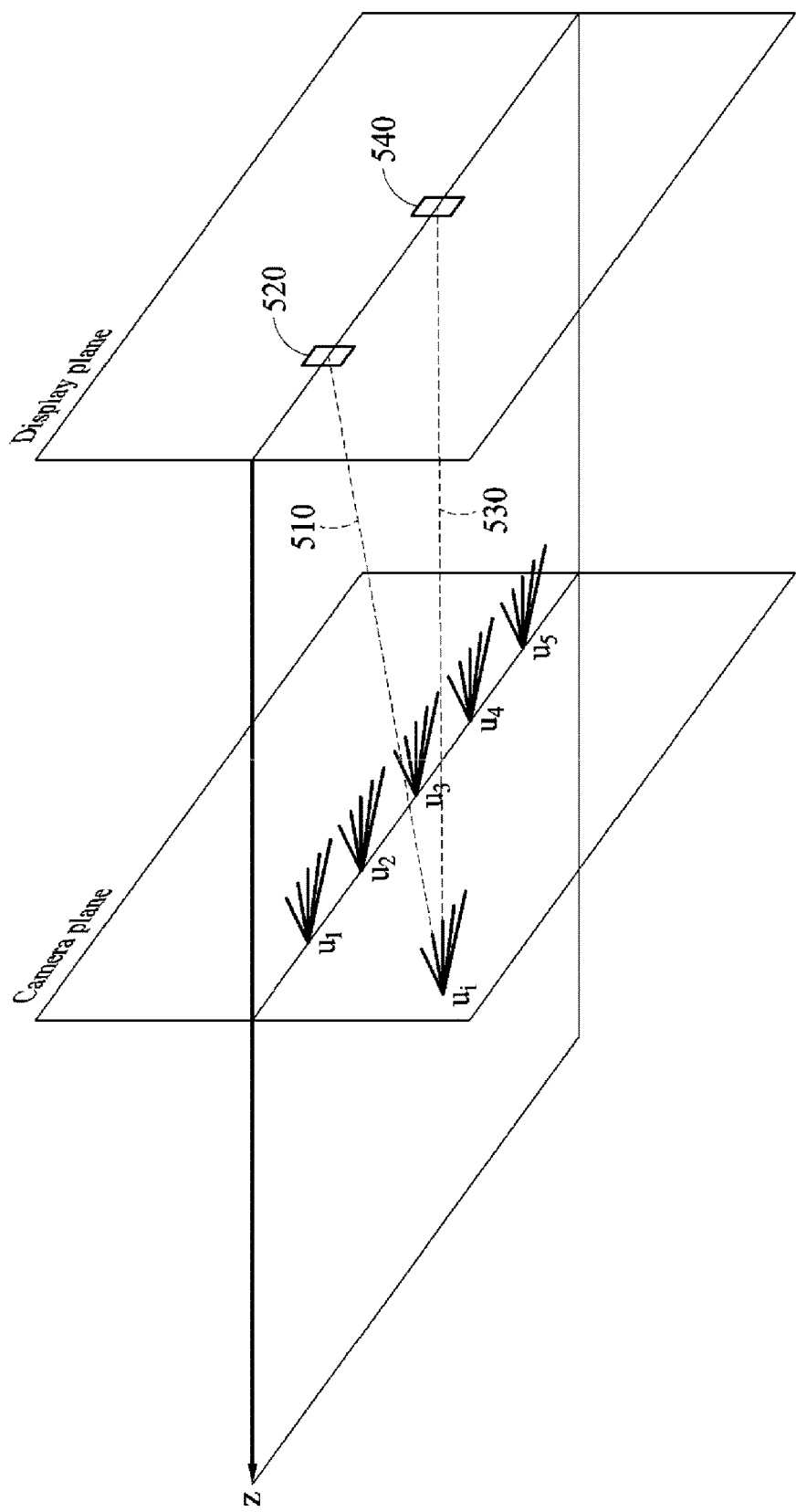

FIGS. 4 and 5 each illustrate a process of determining two reference viewpoints closest to a ray according to an exemplary embodiment.

FIG. 4 illustrates an example of a method by which an image processing apparatus determines the two reference viewpoints closest to the ray.

In an example, a viewpoint $u_i$ of an image to be rendered by the image processing apparatus is located on a camera plane. In this example, two reference viewpoints closest to a ray 410 output from a pixel 420 of a display and propagated to the viewpoint $u_i$ are determined to be a third reference viewpoint $u_3$ and a fourth reference viewpoint $u_4$. With respect to other rays corresponding to the viewpoint $u_i$, two closest reference viewpoints may also be determined to be the third reference viewpoint $u_3$ and the fourth reference viewpoint $u_4$.

That is, when the viewpoint $u_i$ is located on the camera plane, two closest reference viewpoints may be unchanged regardless of the ray corresponding to the viewpoint $u_i$, and two viewpoints located closest to the viewpoint $u_i$ may be determined based on a position of the viewpoint $u_i$.

FIG. 5 illustrates another example of a method by which an image processing apparatus determines two reference viewpoints closest to a ray.

In an example, a viewpoint $u_i$ of an image to be rendered by the image processing apparatus is not located on a camera plane. In this example, two closest reference viewpoints may be different depending on a ray corresponding to the viewpoint $u_i$.

For example, in a case of a first ray 510 output from a first pixel 520 and propagated to the viewpoint $u_i$, two reference viewpoints closest to the first ray 510 may be determined to be a second reference viewpoint $u_2$ and a third reference viewpoint $u_3$. In addition, in a case of a second ray 530 output from a second pixel 540 and propagated to the viewpoint $u_i$, two reference viewpoints closest to the second ray 530 may be determined to be third reference viewpoint $u_3$ and a fourth reference viewpoint $u_4$.

That is, in response to the viewpoint $u_i$ not being located on the camera plane, two closest reference viewpoints may be different depending on the ray corresponding to the viewpoint $u_i$.

The image processing apparatus may determine two reference viewpoints closest to the ray based on a distance from each of the reference viewpoints to the ray. The image processing apparatus may determine two reference viewpoints having a shortest distance from each of the reference viewpoints to the ray to be two reference viewpoints closest to the ray. For example, as the first ray 510 is propagated between the second reference viewpoint $u_2$ and the third reference viewpoint $u_3$, two reference viewpoints closest to the first ray 510 may be determined to be the second reference viewpoint $u_2$ and the third reference viewpoint $u_3$.

Figure 6:
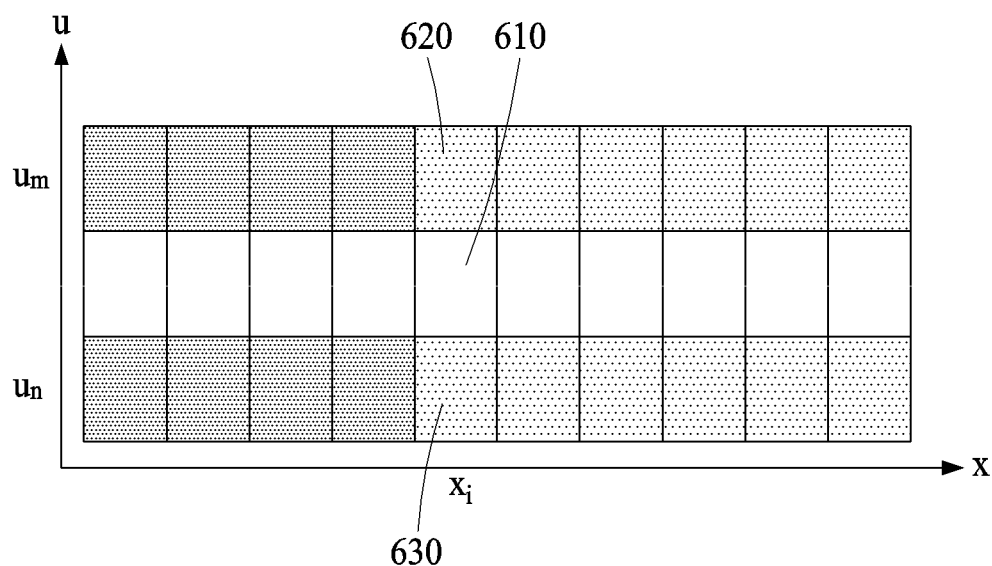
FIGS. 6 and 7 each illustrate a process of determining a color value of a ray according to an exemplary embodiment.
Figure 7:
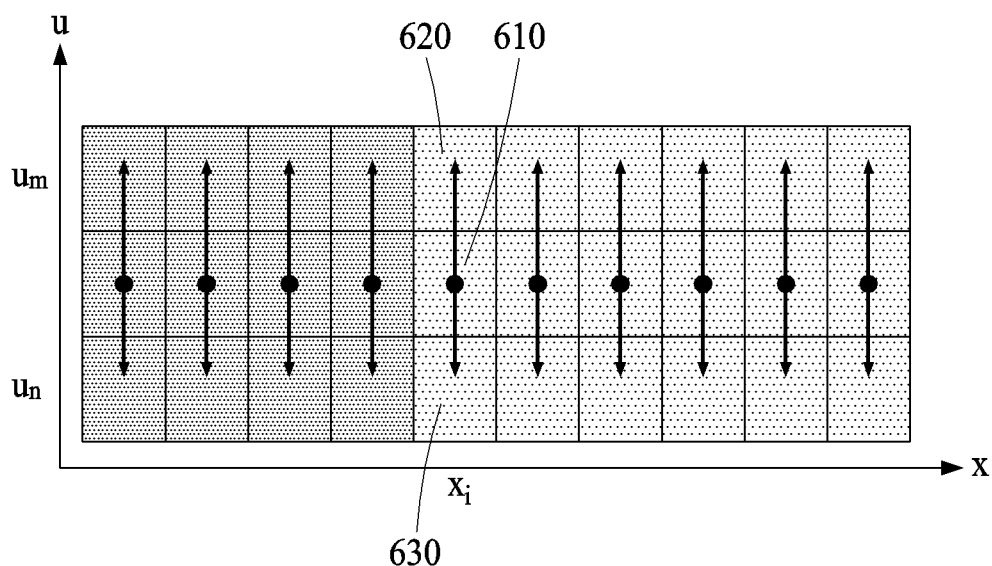

FIGS. 6 and 7 each illustrate a process of determining a color value of a ray according to an exemplary embodiment.

FIG. 6 illustrates an example of a method by which an image processing apparatus determines a color value of a ray based on reference rays of two closest reference viewpoints.

An x-u plane of FIG. 6 includes an x-axis of a display plane and a u-axis of a camera plane of FIG. 3. Each block illustrated in the x-u plane may indicate a ray output from a pixel corresponding to a viewpoint. For example, a block $(x_i, u_m)$ on the x-u plane indicates a reference ray output from a pixel $x_i$ at an m-th reference viewpoint $u_m$, and a color value of the block $(x_i, u_m)$ indicates a color value of the reference ray output from the pixel $x_i$ at the m-th reference viewpoint $u_m$. Thus, blocks of which a value of u corresponds to $u_m$ may indicate reference rays corresponding to the m-th reference viewpoint $u_m$. Similarly, a block $(x_i, u_n)$ on the x-u plane indicates a reference ray output from the pixel $x_i$ at an n-th reference viewpoint $u_n$, and a color value of the block $(x_i, u_n)$ indicates a color value of the reference ray output from the pixel $x_i$ at the n-th reference viewpoint $u_n$.

Blocks located between blocks corresponding to the m-th reference viewpoint $u_m$ and blocks corresponding to the n-th reference viewpoint $u_n$ illustrated in FIG. 6 may indicate rays corresponding to a viewpoint $u_i$ of an image to be generated by the image processing apparatus.

For example, it is assumed that the m-th reference viewpoint $u_m$ and the n-th reference viewpoint $u_n$ are determined to be two reference viewpoints closest to a ray 610. Also, the image processing apparatus may select a reference ray closest to the ray 610 from among the reference rays corresponding to the m-th reference viewpoint $u_m$ and the reference ray closest to the ray 610 from among the reference rays corresponding to the n-th reference viewpoint $u_n$. For example, the image processing apparatus selects a reference ray 620 as a reference ray closest to the ray 610 among the reference rays corresponding to the m-th reference viewpoint $u_m$. In this example, the reference ray 620 may be a reference ray corresponding to the pixel $x_i$ of a display to output the ray 610 among the reference rays corresponding to the m-th reference viewpoint $u_m$. Similarly, the image processing apparatus may select a reference ray 630 as the reference ray closest to the ray 610 from among the reference rays corresponding to the n-th reference viewpoint $u_n$.

FIG. 7 illustrates an example of the method by which the image processing apparatus determines a color value of the ray 610 based on the color values of the selected reference rays 620 and 630.

The image processing apparatus may verify whether a difference between color values of the selected reference rays 620 and 630 is less than or equal to a threshold. For example, the image processing apparatus calculates a squared sum error (SSD) with respect to the color values of the reference rays 620 and 630 and verifies whether the calculated SSD is less than or equal to the threshold. Alternatively, the image processing apparatus calculates an absolute difference between the color values of the reference rays 620 and 630 and verifies whether the calculated absolute difference is less than or equal to the threshold. In addition, various schemes for calculating the difference between the color values of the reference rays 620 and 630 may be applicable without limitation.

In response to the difference between the color values of the selected reference rays 620 and 630 being less than or equal to the threshold, the image processing apparatus may determine the color value of the ray 610 based on the color values of the reference rays 620 and 630. For example, the image processing apparatus interpolates the color value of the ray 610 based on the color values of the reference rays 620 and 630. In this example, interpolation may be linearly performed such that a number of operations needed for performing the interpolation is greatly reduced.

The image processing apparatus may determine color values of other rays based on the aforementioned method.

Figure 8:
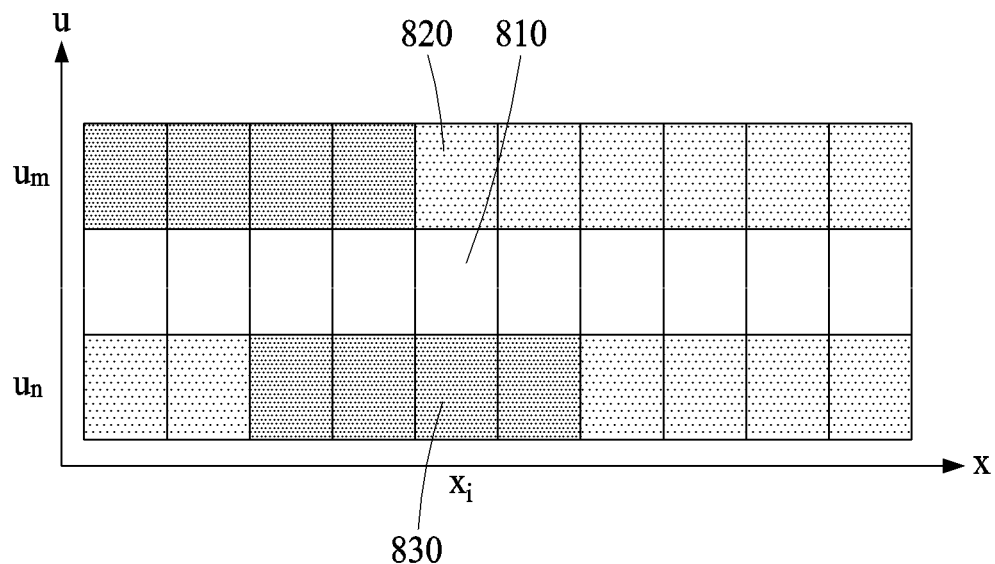
FIGS. 8, 9, and 10 each illustrate a process of determining a color value of a ray according to an exemplary embodiment.
Figure 9:
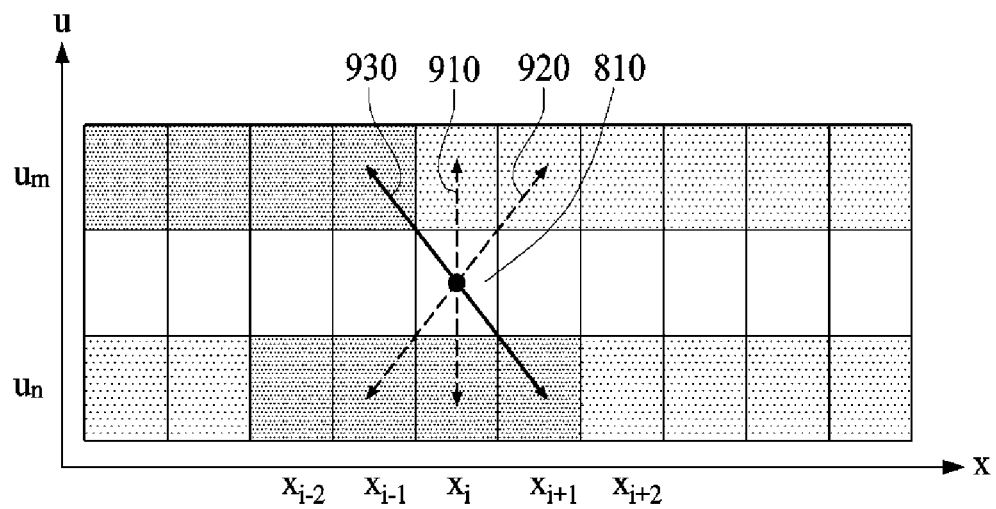
Figure 10:
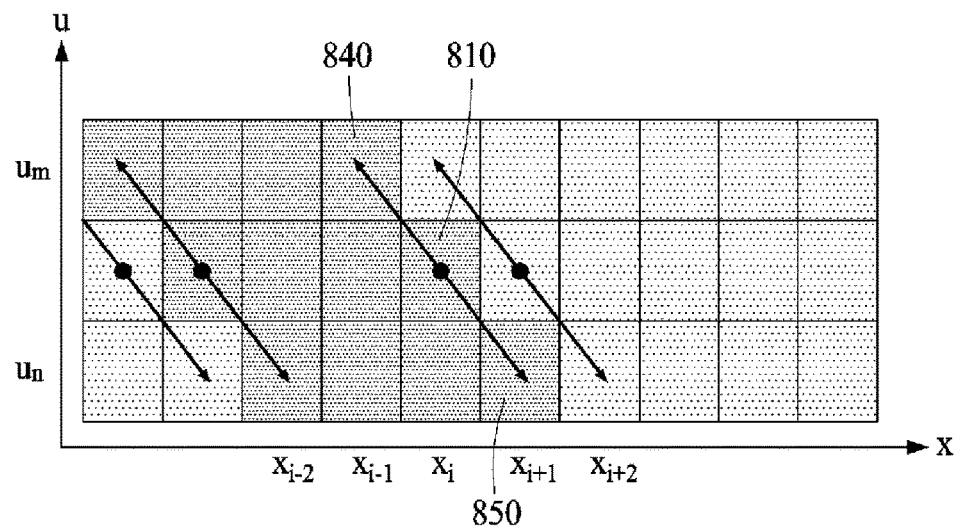

FIGS. 8, 9, and 10 each illustrate a process of determining a color value of a ray according to an exemplary embodiment.

FIG. 8 illustrates another example of a method by which an image processing apparatus determines a color value of a ray based on reference rays of two closest reference viewpoints.

Referring to FIG. 8, a difference between color values of reference rays 820 and 830 selected to be closest to a ray 810 may exceed a threshold. In this example, the image processing apparatus verifies that an edge is absent from the reference rays 820 and 830 and reselects reference rays instead of determining a color value of the ray 810 based on the color values of the reference rays 820 and 830.

FIG. 9 illustrates an example of a method by which the image processing apparatus reselects reference rays.

As described above with reference to FIG. 8, in response to a directivity that forms an edge being absent from a first directivity 910, the image processing apparatus may search for the directivity that forms the edge among neighboring pixels of a pixel $x_i$ to reselect the reference rays. The first directivity 910 is a most basic directivity and corresponds to the cases described above with reference to FIGS. 6 and 7. In the case of FIG. 8, as already described, an edge is absent from the first directivity 910. Here, the first directivity 910 is referred to as a basic directivity.

The image processing apparatus may verify whether the directivity that forms the edge exists in the neighboring pixels based on color values of the neighboring pixels close to the pixel $x_i$. Such verification may be performed on the neighboring pixels in an order of proximity to the pixel $x_i$, and the neighboring pixels to be verified may be selected such that the neighboring pixels are symmetrical about the pixel $x_i$.

For example, the image processing apparatus verifies whether a directivity 920 that forms the edge in a block $(x_{i+1}, u_m)$ and a block $(x_{i-1}, u_n)$ exists. The image processing apparatus may verify that the edge is absent from the directivity 920 based on verification that a difference between color values of the block $(x_{i+1}, u_m)$ and the block $(x_{i-1}, u_n)$ exceeds a threshold.

In addition, the image processing apparatus may verify whether the edge exists in a directivity 930 based on the block $(x_{i+1}, u_n)$ and the block $(x_{i-1}, u_m)$. The image processing apparatus may verify that the edge exists in the directivity 930 based on verification that the difference between the color values of the block $(x_{i+1}, u_n)$ and the block $(x_{i-1}, u_m)$ is less than or equal to the threshold. The image processing apparatus may reselect reference rays corresponding to the block $(x_{i+1}, u_n)$ and the block $(x_{i-1}, u_m)$ based on the directivity 930.

Based on verification that the directivity that forms the edge is absent from neighboring pixels $x_{i-1}$ and $x_{i+1}$, the image processing apparatus may sequentially verify whether the directivity that forms the edge exists in next neighboring pixels $x_{i-2}$ and $x_{i+2}$.

FIG. 10 illustrates an example of a method by which the image processing apparatus determines the color value of the ray 810 based on reselected reference rays 840 and 850.

The image processing apparatus determines the color value of the ray 810 based on color values of the reselected reference rays 840 and 850. For example, the image processing apparatus interpolates the color value of the ray 810 based on the color values of the reference rays 840 and 850.

With respect to other rays, the image processing apparatus may determine a color value of a ray by searching for the directivity that forms the edge based on the ray. For example, the image processing apparatus performs interpolation on a texture area in which an edge exists based on the edge, and performs simple interpolation on a textureless area in which the edge is absent based on a basic directivity, for example, a vertical directivity.

FIGS. 11, 12, 13, and 14 each illustrate a process of determining a color value of a ray using an x-u plane according to an exemplary embodiment.

Figure 11:
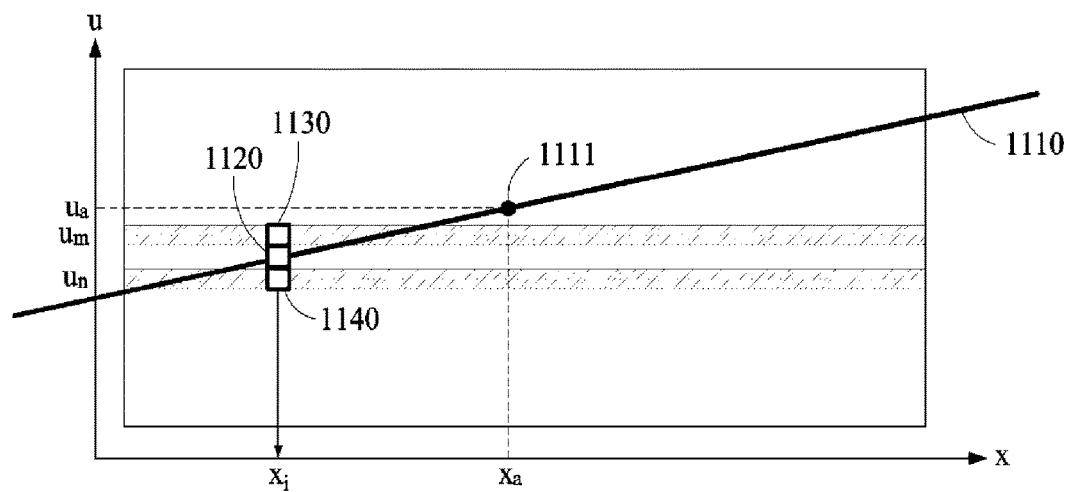
FIGS. 11, 12, 13, and 14 each illustrate a process of determining a color value of a ray using an x-u plane according to an exemplary embodiment.

FIG. 11 illustrates an example of the process of determining the color value of the ray using the x-u plane.

In an example, a viewpoint of an image generated by an image processing apparatus may not be located on a camera plane. In this example, a set of rays included in the image may be indicated by a straight line 1110 on the x-u plane. The straight line 1110 may be determined based on a predetermined gradient and a single point 1111. A detailed description of a process of determining the single point 1111 and the gradient of the straight line 1110 will be provided with reference to FIGS. 12 through 14.

Two reference viewpoints closest to a ray of which a color value is to be determined may be determined based on the straight line 1110. For example, to determine a color value of a ray 1120 output from a pixel $x_i$, a block corresponding to a point at which the straight line 1110 meets $x=x_i$ may be identified. Also, two reference viewpoints $u_m$ and $u_n$ closest to the corresponding block may be identified. Thus, two reference rays among reference rays of the reference viewpoints $u_m$ and $u_n$ may be used to determine the color value of the ray 1120. Two reference viewpoints 1130 and 1140 closest to the ray 1120 may be firstly selected from among the reference rays of the reference viewpoints $u_m$ and $u_n$. The selected reference viewpoints 1130 and 1140 may correspond to the identical pixel $x_i$ of the ray 1120. Repeated descriptions will be omitted for increased clarity and conciseness because the above-described operations are also applicable to subsequent processes.

In response to the straight line 1110 having a predetermined gradient, two reference viewpoints closest to the ray may be different depending on the ray of which the color value is to be determined.

In an example, when the viewpoint of the image to be generated by the image processing apparatus is located on the camera plane, the gradient of the straight line 1110 is 0 when two reference viewpoints closest to the ray may be fixed without a change based on the ray of which the color value is to be determined.

Figure 12:
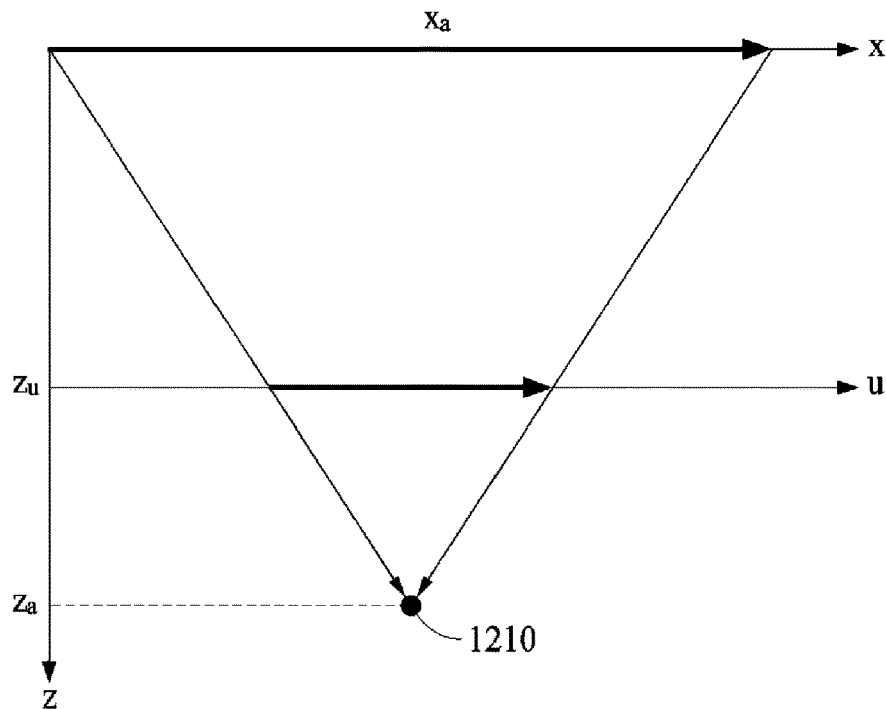

FIG. 12 illustrates an example of a process of determining the gradient of the straight line 1110 described with reference to FIG. 11 when a viewpoint 1210 is located farther from a display plane than a camera plane.

As a value of x corresponding to the viewpoint 1210 increases, a value of u increases when the viewpoint 1210 is located farther from the display plane than the camera plane, for example, $z_a$ is greater than $z_u$ ($z_a > z_u$) (indicated by thick arrows illustrated in FIG. 12). Thus, the gradient of the straight line 1110 described with reference to FIG. 11 has a positive value. In addition, when the viewpoint 1210 is located farther from the camera plane than when the viewpoint 1210 is located close to the camera plane, an amount of change in the value of u based on a change in the value of x may be relatively great. Thus, as the viewpoint 1210 is located farther from the camera plane, a value of the gradient of the straight line 1110 may increase.

Figure 13:
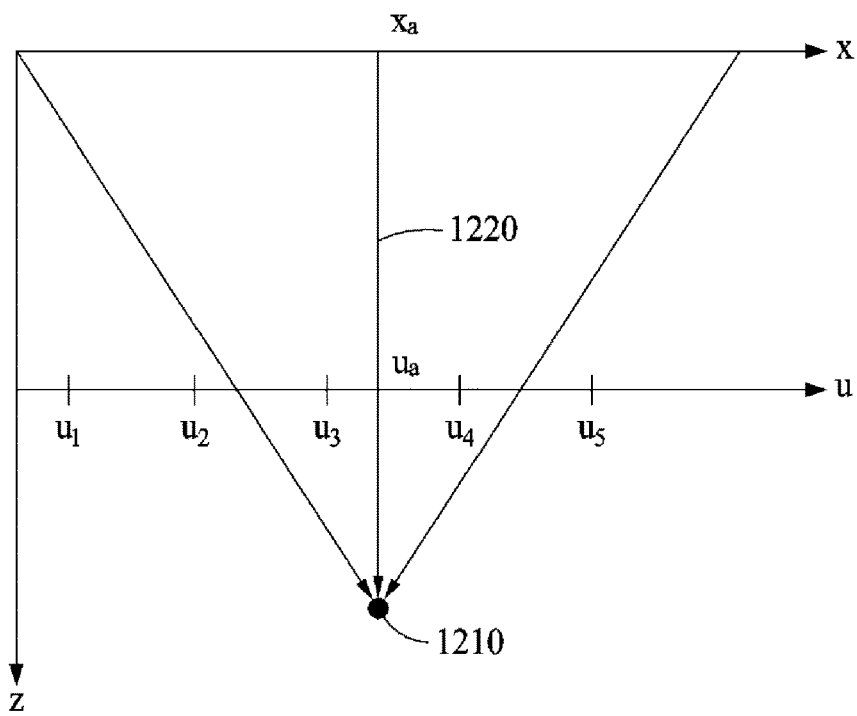

FIG. 13 illustrates an example of a process of determining a single point of the straight line 1110 described with reference to FIG. 11.

A single ray 1220 corresponding to the viewpoint 1210 is illustrated. Here, the single point of the straight line 1110 may be determined based on a pixel $x_a$ that outputs the ray 1220 and a point at which the ray 1220 meets a u-axis. That is, the single point of the straight line 1110 may be determined to be a point $(x_a, u_a)$.

Figure 14:
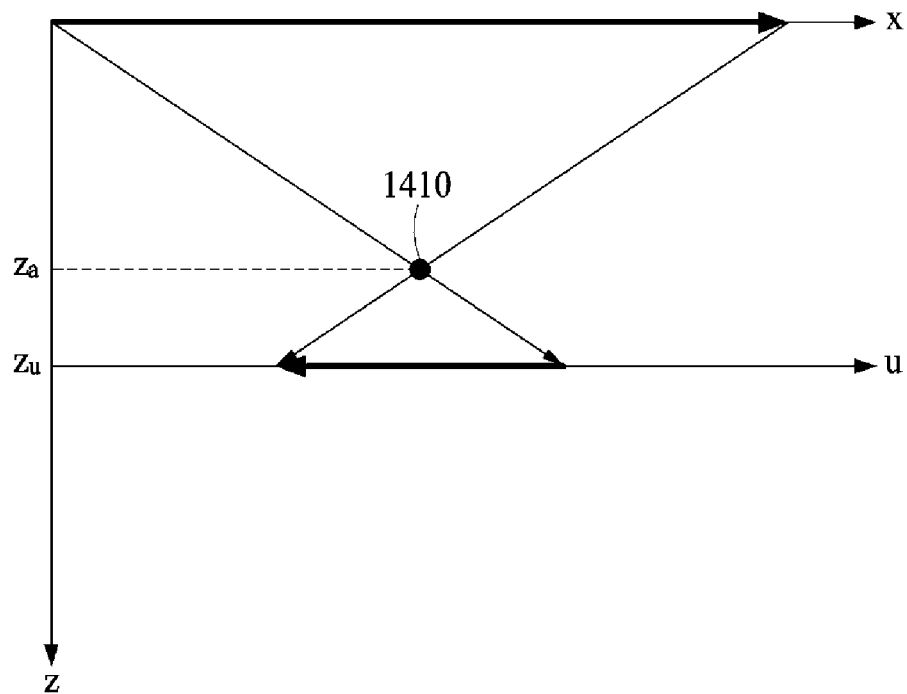

FIG. 14 illustrates an example of a process of determining the gradient of the straight line 1110 described with reference to FIG. 11 when a viewpoint 1410 is located closer to a display plane than a camera plane.

As a value of x corresponding to the viewpoint 1410 increases, a value of u decreases when the viewpoint 1410 is located closer to the display plane than the camera plane, for example, $z_a$ is less than $z_u$ ($z_a < z_u$) (indicated by thick arrows illustrated in FIG. 14). Thus, the gradient of the straight line 1110 described with reference to FIG. 11 has a negative value. In addition, when the viewpoint 1410 is located farther from the display plane than when the viewpoint 1410 is located close to the display plane, an amount of change in the value of u based on the change in the value of x may be relatively small. Thus, as the viewpoint 1410 is located farther from the display plane ($z_a < z_u$ indicates that the viewpoint 1410 is not allowed to be located farther from the display plane than the camera plane), an absolute value of the gradient of the straight line 1110 may decrease.

Even when the viewpoint 1410 is located closer to the display plane than the camera plane, the single point of the straight line 1110 may be determined based on the method described with reference to FIG. 13. Thus, repeated descriptions will be omitted for increased clarity and conciseness.

Figure 15:
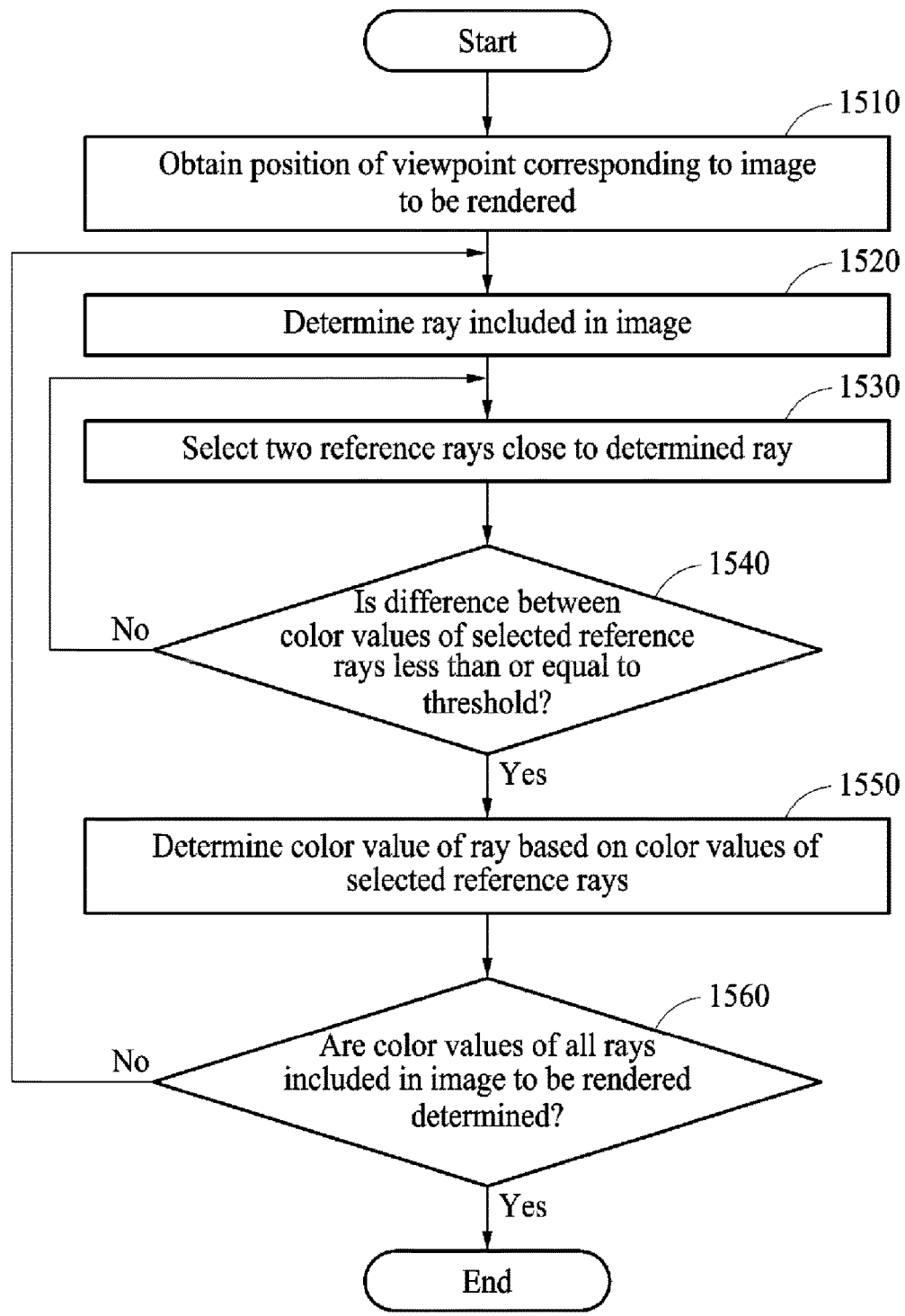
FIG. 15 is a flowchart illustrating a method of processing an image according to an exemplary embodiment.

FIG. 15 is a flowchart illustrating a method of processing an image according to an exemplary embodiment.

FIG. 15 illustrates the method of processing the image performed by a processor of an image processing apparatus.

In operation 1510, the image processing apparatus obtains a position of a viewpoint corresponding to an image to be rendered. For example, the image processing apparatus obtains a value of coordinates (x, y, z) of the viewpoint corresponding to the image to be rendered.

In operation 1520, the image processing apparatus determines a ray included in the image. The image processing apparatus may determine a ray of which a color value is to be determined among a plurality of rays included in the image. Here, a ray of which the color value is already determined may be excluded.

In operation 1530, the image processing apparatus selects two reference rays close to the determined ray. According to an exemplary embodiment, the image processing apparatus may select two reference rays closest to the determined ray.

The image processing apparatus may determine two reference viewpoints closest to the ray among different reference viewpoints based on the position of the viewpoint. For example, the image processing apparatus determines two reference viewpoints closest to the ray based on a distance from each of different reference viewpoints to the ray.

The image processing apparatus may select two reference rays closest to the ray from among reference rays corresponding to the determined reference viewpoints. For example, the image processing apparatus selects two reference rays each corresponding to a pixel of a display that outputs the ray from among the reference rays corresponding to the determined reference viewpoints.

In operation 1540, the image processing apparatus determines whether a difference between color values of the selected reference rays is less than or equal to a threshold. For example, the image processing apparatus calculates the difference between the color values of the selected reference rays using any one of a squared sum error (SSD) and an absolute difference.

In response to determining that the difference between color values of the selected reference rays is less than or equal to the threshold in operation 1540, the image processing apparatus determines the color value of the ray based on the color values of the selected reference rays in operation 1550. For example, the image processing apparatus interpolates the color value of the ray based on the color values of the selected reference rays. In this example, the interpolation performed by the image processing apparatus may be bilinear interpolation.

In response to determining that the difference between the color values of the selected reference rays exceeds the threshold in operation 1540, the image processing apparatus reselects reference rays corresponding to neighboring pixels that are symmetrical about a pixel that outputs the ray. For example, the image processing apparatus selects neighboring pixels based on whether an edge exists in the neighboring pixels that are symmetrical about the pixel and reselects reference rays output from the selected neighboring pixels. In addition, the image processing apparatus may determine the neighboring pixels that are symmetrical about the pixel in an order of proximity to the pixel that outputs the ray and reselect the reference rays output from the determined neighboring pixels. Here, the reselected reference rays may correspond to two reference viewpoints determined to be closest to the ray.

In operation 1560, the image processing apparatus determines whether color values of all rays included in the image to be rendered are determined. In response to determining that the color values of all rays have not yet been determined, the image processing apparatus determines a ray of which a color value is not determined in operation 1520. In response to determining that the color values of all rays have been determined, the image processing apparatus terminates an operation of generating the image to be rendered.

Repeated descriptions will be omitted for increased clarity and conciseness because the descriptions provided with reference to FIGS. 1 through 14 may also be applicable to FIG. 15.

Figure 16:
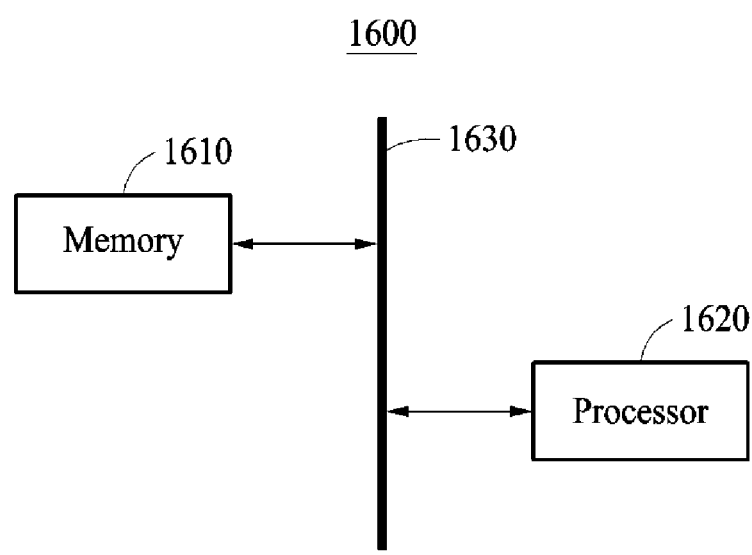
FIG. 16 is a block diagram illustrating an image processing apparatus according to an exemplary embodiment.

FIG. 16 is a block diagram illustrating an image processing apparatus according to an exemplary embodiment.

Referring to FIG. 16, an image processing apparatus 1600 includes a memory 1610 and a processor 1620. The memory 1610 and the processor 1620 may exchange data through a bus 1630.

The memory 1610 may include a volatile memory and a non-volatile memory. The memory 1610 stores information received through the bus 1630. The memory 1610 includes at least one instruction to be executed by the processor 1620.

The processor 1620 executes at least one instruction stored in the memory 1610. The processor 1620 obtains a position of a viewpoint corresponding to an image to be rendered. In addition, the processor 1620 selects two reference rays closest to a ray included in the image from among a plurality of reference rays included in reference images photographed in advance from different reference viewpoints based on the position of the viewpoint. The processor 1620 verifies whether a difference between color values of the selected reference rays is less than or equal to a threshold. In response to the difference between color values of the selected reference rays being less than or equal to the threshold, the processor 1620 determines the color value of the ray based on the color values of the selected reference rays.

For example, the image processing apparatus 1600 may be provided as a virtual reality (VR) device worn by a user. In this example, the image processing apparatus 1600 may obtain a position of the image processing apparatus 1600 through at least one sensor, for example, a gyro sensor and an acceleration sensor, included in the image processing apparatus 1600 and provide the user with an image based on the obtained position. Also, the image processing apparatus 1600 may generate, at the obtained position, a stereo image to which a distance between both eyes of the user is reflected and thus, the user viewing the generated image may experience a three-dimensional (3D) effect in addition to viewing an image corresponding to a position of the user.

Repeated descriptions will be omitted for increased clarity and conciseness because the descriptions provided with reference to FIGS. 1 through 15 are also applicable to each of constituent elements illustrated in FIG. 16.

Exemplary embodiments may generate an image of a new viewpoint based on an interpolation performed between two reference rays included in a multi-view image such that a number of operations, an amount of time used for performing an operation, and a volume of data needed for generating the image of the new viewpoint may be effectively reduced.

Exemplary embodiments may provide a method of processing an image to be performed in real time or online by determining a color value of a ray of which a color value is to be determined among reference rays included in a multi-view image. Above-described exemplary embodiments may be implemented as a software solution or in a form of a chip to be included in a mobile device, a tablet computer, a display device, and a 3D device.

The above-described exemplary embodiments may be recorded in non-transitory computer-readable media including program instructions to implement various operations that may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules to perform the operations of the above-described exemplary embodiments, or vice versa.

The foregoing exemplary embodiments are examples and are not to be construed as limiting. The present teachings can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of processing an image, the method comprising:
   obtaining a position of a viewpoint corresponding to the image;
   selecting, based on the position, two reference rays closest to a ray included in the image from among a plurality of reference rays included in reference images photographed in advance from different reference viewpoints;
   determining whether a difference between color values of the selected reference rays is less than or equal to a threshold; and
   determining a color value of the ray based on the color values of the selected reference rays in response to the difference between the color values of the selected reference rays being determined to be less than or equal to the threshold.

2. The method of claim 1, wherein the selecting of the reference rays comprises:
   determining two reference viewpoints closest to the ray among the different reference viewpoints based on the position and selecting the two reference rays closest to the ray from among reference rays corresponding to the determined reference viewpoints.

3. The method of claim 2, wherein the selecting of the reference rays further comprises:
   selecting two reference rays each corresponding to a pixel that outputs the ray from among the reference rays corresponding to the determined reference viewpoints.

4. The method of claim 2, wherein the determining of the two reference viewpoints comprises determining the two reference viewpoints closest to the ray based on a distance from each of the different reference viewpoints to the ray.

5. The method of claim 1, further comprising:
   reselecting reference rays corresponding to neighboring pixels that are symmetrical about a pixel that outputs the ray in response to the difference between the color values of the selected reference rays being determined to exceed the threshold; and
   determining whether a difference between color values of the reselected reference rays is less than or equal to the threshold.

6. The method of claim 5, wherein the reselecting of the reference rays comprises selecting neighboring pixels in which an edge exists from among the neighboring pixels that are symmetrical about the pixel and reselecting reference rays output from the selected neighboring pixels.

7. The method of claim 5, wherein the reselecting of the reference rays comprises determining the neighboring pixels that are symmetrical about the pixel in an order of proximity to the pixel and reselecting reference rays output from the determined neighboring pixels.

8. The method of claim 5, wherein the reselected reference rays correspond to two reference viewpoints determined to be closest to the ray.

9. The method of claim 1, wherein the determining of the color value of the ray comprises interpolating the color value of the ray based on the color values of the selected reference rays.

10. The method of claim 1, further comprising outputting the ray from a pixel of a display that displays the image such that the ray is propagated to the viewpoint.

11. A non-transitory computer-readable storage medium storing a program which, when executed, causes a computer to implement the method of claim 1.

12. An image processing apparatus comprising:
    a processor; and
    a memory including at least one instruction to be executed by the processor,
    wherein, in response to the at least one instruction being executed by the processor, the processor is configured to obtain a position of a viewpoint corresponding to an image, select, based on the position, two reference rays closest to a ray included in the image from among a plurality of reference images photographed in advance from different reference viewpoints, determine whether a difference between color values of the selected reference rays is less than or equal to a threshold, and determine a color value of the ray based on the color values of the selected reference rays in response to the difference between the color values of the selected reference rays being determined to be less than or equal to the threshold.

13. The image processing apparatus of claim 12, wherein the processor is further configured to determine two reference viewpoints closest to the ray among the different reference viewpoints based on the position and select the two reference rays closest to the ray from among reference rays corresponding to the determined reference viewpoints.

14. The image processing apparatus of claim 13, wherein the processor is further configured to select two reference rays each corresponding to a pixel that outputs the ray from among the reference rays corresponding to the determined reference viewpoints.

15. The image processing apparatus of claim 12, wherein the processor is further configured to reselect reference rays corresponding to neighboring pixels that are symmetrical about a pixel that outputs the ray in response to the difference between the color values of the selected reference rays being determined to exceed the threshold and determine whether a difference between color values of the reselected reference rays is less than or equal to the threshold.

16. The image processing apparatus of claim 15, wherein the processor is further configured to determine the neighboring pixels that are symmetrical about the pixel in an order of proximity to the pixel and reselect reference rays output from the determined neighboring pixels.

17. The image processing apparatus of claim 15, wherein the reselected reference rays correspond to two reference viewpoints determined to be closest to the ray.

18. The image processing apparatus of claim 12, wherein the processor is further configured to interpolate the color value of the ray based on the color values of the selected reference rays.

* * * * *